US007468667B2

(12) United States Patent
Moffett

(10) Patent No.: US 7,468,667 B2

(45) Date of Patent: Dec. 23, 2008

(54) ANTI-THIEF OWNER NOTIFICATION ALARM SYSTEM FOR A TWO-WHEELED VEHICLE, AND METHOD OF SAME

(76) Inventor: Robert L. Moffett, 4862 S. Grand, Monroe, LA (US) 71202

( * ) Notice: Subject to any disclaimer, the term of this patent is extended or adjusted under 35 U.S.C. 154(b) by 207 days.

(21) Appl. No.: 11/437,165

(22) Filed: May 19, 2006

(65) Prior Publication Data

US 2007/0268117 A1 Nov. 22, 2007

(51) Int. Cl.
*G08B 13/14* (2006.01)

(52) U.S. Cl. ................... 340/571; 340/432; 340/539.13

(58) Field of Classification Search ................. 340/571, 340/429, 566, 426.19, 432, 539.13; 33/355 R
See application file for complete search history.

(56) References Cited

U.S. PATENT DOCUMENTS 4,284,984 A * 8/1981 Scarpino et al. ............. 340/429
4,638,294 A * 1/1987 Sakurai ................. 340/426.26
4,665,379 A * 5/1987 Howell et al. .......... 340/426.21
5,530,427 A * 6/1996 Shieh ......................... 340/542
5,539,377 A * 7/1996 Dillon ................... 340/426.11
6,014,555 A * 1/2000 Tendler ................... 455/404.1
6,268,794 B1 * 7/2001 Tzanev ....................... 340/475
6,816,090 B2 * 11/2004 Teckchandani et al. 340/539.13
6,956,467 B1 * 10/2005 Mercado, Jr. .......... 340/426.13
7,158,883 B2 * 1/2007 Fuchs et al. ................. 340/440
7,194,816 B2 * 3/2007 Tamura .................... 33/355 R
2006/0164217 A1 * 7/2006 Bourgine De Meder ..... 340/432

* cited by examiner

*Primary Examiner*—John A Tweel, Jr.
(74) *Attorney, Agent, or Firm*—Raymond M. Galasso; Galasso & Associates, LP

(57) ABSTRACT

A tamper and theft detection alarm system is provided for a motorcycle, bicycle or other two-wheeled vehicle. The alarm system is configured to detect vehicle movement or theft by monitoring the tilt angle of the vehicle, and once a change in the tilt angle is detected, notifying the rider or owner by wireless cellular telephone. In certain embodiments the motorcycle or bicycle alarm system is additionally provided with a Global Positioning System (GPS) receiver configured to receive signals from the United States govemment's Global Positioning System (GPS) satellites or other similar global position locating systems and then interpreting the satellite signals to calculate the vehicle location in global coordinates and then providing these coordinates via synthesized speech to the owner via wireless cellular telephony.

9 Claims, 4 Drawing Sheets

ANTI-THIEF OWNER NOTIFICATION ALARM SYSTEM FOR A TWO-WHEELED VEHICLE, AND METHOD OF SAME

CROSS REFERENCE TO RELATED APPLICATIONS

This application relies upon United States Patent and Trademark Office disclosure document number 571,903 filed on Mar. 1, 2005, as evidence of a conception date earlier than the filing date of the present patent application.

FIELD OF THE DISCLOSURE

The disclosures made herein relate generally to the field of vehicle security alarm systems and more particularly, to an electronic vehicle security alarm system for motorcycles, bicycles or other two-wheeled vehicles.

BACKGROUND

Motorcycles are widely used as an enjoyable and fuel efficient means of conveyance, to ride and see the countryside and enjoy a warm day, as well as for just plain fuel efficient transportation. Motorcycles and bicycles are easier for a thief to steal than an automobile, this due to the lighter weight and smaller size of these two-wheeled vehicles. As can be appreciated, a thief can make off with a motorcycle or bicycle by simply standing the bike upright, raising the side stand and just walking the bike down the road. Of course bicycle theft is especially easy as the bicycle's lighter weight means the bike can just be picked up by a thief and carried away.

Conventional means of protecting a bicycle or motorcycle from theft include the use of a combination or key locking device inserted through the wheel spokes to the frame, as well as ignition keys on motorcycles. Such means are relatively ineffective in providing theft protection for the reasons discussed earlier.

There is a need for a motorcycle or bicycle theft alarm system that is able to detect when the vehicle is moved, tampered with or when a theft is in progress.

Many types of alarm systems are known, particularly for larger vehicles such as automobiles. Conventional types of theft alarms that are available for use with larger vehicles often provide an audible or visual alert when triggered. Such alarms, for example, may sound an audible alarm such as a vehicle horn or flash the headlights in a regular pattern or other means of drawing attention to the vehicle so as to call the public's attention to the vehicle and thereby deter a would be thief. These conventional alarms have a drawback, however, in that the thief is then alerted to the presence of the alarm, and can quickly locate and defeat the alarm, particularly on a small open frame vehicle such as a motorcycle or bicycle.

Therefore, what is needed is a motorcycle or bicycle theft alarm system that operates silently without alerting a would be thief, an alarm that can notify the owner without alerting the thief that the theft has been detected and reported.

Additionally, bicycles and motorcycles, once stolen, are often very difficult for the owner or authorities to locate and recover. There is a need for a motorcycle or bicycle theft alarm system that can transmit the vehicle location to the owner in a silent and wireless way, again without alerting a thief to its presence.

Therefore, a motorcycle and bicycle alarm system that overcomes limitations associated with such conventional vehicle security devices and systems would be useful and novel.

SUMMARY OF THE DISCLOSURE

Accordingly, embodiments of the inventive disclosures made herein comprise a motorcycle or bicycle alarm system configured to detect vehicle movement or theft by monitoring the tilt angle of the vehicle and once movement is detected to alert the owner by wireless cellular telephone. Certain embodiments of the motorcycle or bicycle alarm system disclosed herein are provided with a Global Positioning System (GPS) receiver configured to receive signals from the United States government's Global Positioning System (GPS) satellites or other similar global position locating systems and then interpreting the satellite signals to calculate the vehicle location in global coordinates and providing these coordinates via synthesized speech to the owner via wireless cellular.

In one embodiment, a motorcycle alarm system comprises a protective control box housing containing a circuit board having electronic logic devices as well as other active and passive electronic components. The alarm circuitry is provided with power supply connections to derive its operating power from the motorcycle battery. With the exception of the power supply connection, all components and sensors are internal to the control box. A key operated alarm system power switch is secured to the front face of the protective housing. A key is required to turn the alarm system power on or off, thereby making the alarm system more difficult to disable. A tilt angle detector is provided interior to the alarm control box. In general, tilt sensors and detectors generate an artificial horizon and measure angular tilt with respect to this horizon. In the preferred embodiment, tilt sensor varieties of interest here are of the type utilizing a metal ball free to roll under the force of gravity within a transparent plastic or glass tube, the tube having electrical contacts to detect when the tilt angle reaches or exceeds a certain angular limit with respect to the artificial horizon. Tilt angle detectors preferred for the subject inventive disclosure include a metal ball contained and rolling within a curved transparent plastic or glass tube, wherein raising the cycle of its side stand rolls the ball roll within the tube according to the change in the tilt angle, and when it reaches within 2 degrees of vertical (90 degrees, +/−2 degrees) relative to the artificial horizon, the alarm is triggered. Another variety of tilt angle detector envisioned for use with the subject alarm system is a mercury type tilt sensor consisting of a closed glass tube inside of which are two electrodes and a drop of mercury free to roll within the tube. The act of raising the cycle off its side stand rest rolls the mercury ball within the tube according to the change in the tilt angle of the cycle. When the cycle reaches within 2 degrees of vertical relative to the artificial horizon, the mercury ball reaches and rolls on the electrodes, thereby allowing electrical current to flow between the electrodes through the mercury drop and thereby triggering the alarm. Both types of tilt angle detectors are known in various forms in the art. Other types of tilt angle detectors may be employed as would be known to those skilled in the art without deviating from the intent and scope of the inventive disclosures herein. For a further example, another type of suitable tilt angle detector is a pendulum type sensor wherein a pendulum or weight used in conjunction with a rotary sensor or rotary switch at the pendulum pivot point. The protective alarm housing is provided with a transparent viewing window through which the tilt angle detector and the position of the metal ball within the transparent tilt detector housing can be viewed. This allows the rider to verify the tilt angle position of the parked motorcycle or bicycle before activating the alarm. An electronic logic and control means is provided on the circuit board mounted within the alarm housing. The logic and control means has an alarm activation input connected to the electrodes of the tilt angle detector. A numeric and symbol keypad is provided on the alarm housing to permit the rider or owner to enter the telephone number to be called, normally the owner's phone number, in the event of a detected alarm. The phone number to be called is stored to the non-volatile memory of the logic and control means and displayed on the electronic alphanumeric display screen secured to a front face of the protective housing of the alarm. Additionally, a cellular telephone device is secured within the alarm housing. The cellular device is electronically interfaced to the logic and control means. The cellular device is configured for initiating and receiving calls over a cellular network under the direction of the logic and control means. The alarm system includes a means of generating an audible alarm that is suitable for transmission over a phone connection. The audible alarm may, for example, consist of a tone having a periodically oscillating frequency that would be understood by the call receiver to be an alarm notice from the alarm system. The audible alarm may also utilize a speech synthesizer configured to produce synthesized human spoken language to more pointedly describe to the call receiver that an alarm condition on the bicycle or motorcycle vehicle has been detected.

The alarm is activated as follows. The motorcycle or bicycle is parked resting on its side stand so as to be tilted relative to the directional force of gravity. The tilt angle is confirmed by viewing the ball position in the tilt angle detector through the viewing window of the alarm housing. When the cycle is resting on its side stand it may typically be resting at 10 degrees off true vertical, or a 10-degree tilt. Once the tilt angle is confirmed, the alarm is powered on by momentarily placing a key into the alarm key switch and rotating to the 'on' position. Once powered on, the phone number to be called in the event of an alarm is entered into the alarm system through the keypad on the face of the protective alarm housing, for example 310 333 3333. The configured number is displayed in the alphanumeric display of the alarm system. At this point the alarm is now configured but not yet activated. The cycle rider can now activate the alarm system by using a telephone or cellular phone to call the cellular device within the alarm system, for example, 310 333 4444. When the call connects, the alarm is activated by depressing an asterisk '*' on the caller's telephone or cell phone keypad, then disconnecting the call. Similarly, the alarm system can be deactivated by using a telephone or cellular phone to call the cellular device within the alarm system, and then depressing the pound '#' key on the telephone or cell phone keypad, then disconnecting.

In a second embodiment, the alarm of the first embodiment includes a battery pack internal to the alarm housing. This embodiment is particularly suited for use with bicycles and other two-wheel vehicles which lack an available power supply to power the alarm system.

In a third embodiment the anti-theft owner notification alarm system for a motorcycle or bicycle additionally comprises a Global Positioning System (GPS) receiver configured to receive signals from the United States government's Global Positioning System (GPS) satellites or other similar global position locating systems, then interpreting the satellite signals to calculate the vehicle location in global coordinates and provide vehicle location coordinates to the logic and control means. The alarm system then utilizes voice synthesis technology to speak the vehicle coordinates in a synthesized human voice during the automatically dialed and executed alarm notification phone call to the owner's or rider's cell phone or other configured phone number.

It is an objective of the inventive disclosures presented herein to provide an alarm system for a motorcycle or bicycle that interfaces with the cellular phone network and is adapted to call a configured telephone so as to provide notification of a tampering or theft alarm condition.

It is another object of the inventive disclosures presented herein to provide an alarm system for a motorcycle or bicycle that supports remote activation and deactivation of the alarm system by way of receiving an activate or deactivate command over a cellular phone call session, thereby permitting the alarm to be activated or deactivated remotely.

It is another object of the inventive disclosures made herein to provide an alarm system for a motorcycle or bicycle that interfaces with the cellular phone network and provides voice synthesis for use over the network to notify the vehicle owner or operator of the GPS coordinates of the vehicle.

These and other objects of the invention made herein will become readily apparent upon further review of the following specification and associated drawings.

BRIEF DESCRIPTION OF THE DRAWINGS

The drawings show a form of the invention that is presently preferred; however, the invention is not limited to the precise arrangement shown in the drawings.

DETAILED DESCRIPTION OF THE DRAWINGS

In preparation for explaining the details of the present inventive disclosure, it is to be understood by the reader that the invention is not limited to the presented details of the construction, materials and embodiments as illustrated in the accompanying drawings, as the invention concepts are clearly capable of other embodiments and of being practiced and realized in various ways by applying the disclosure presented herein.

Figure 1:
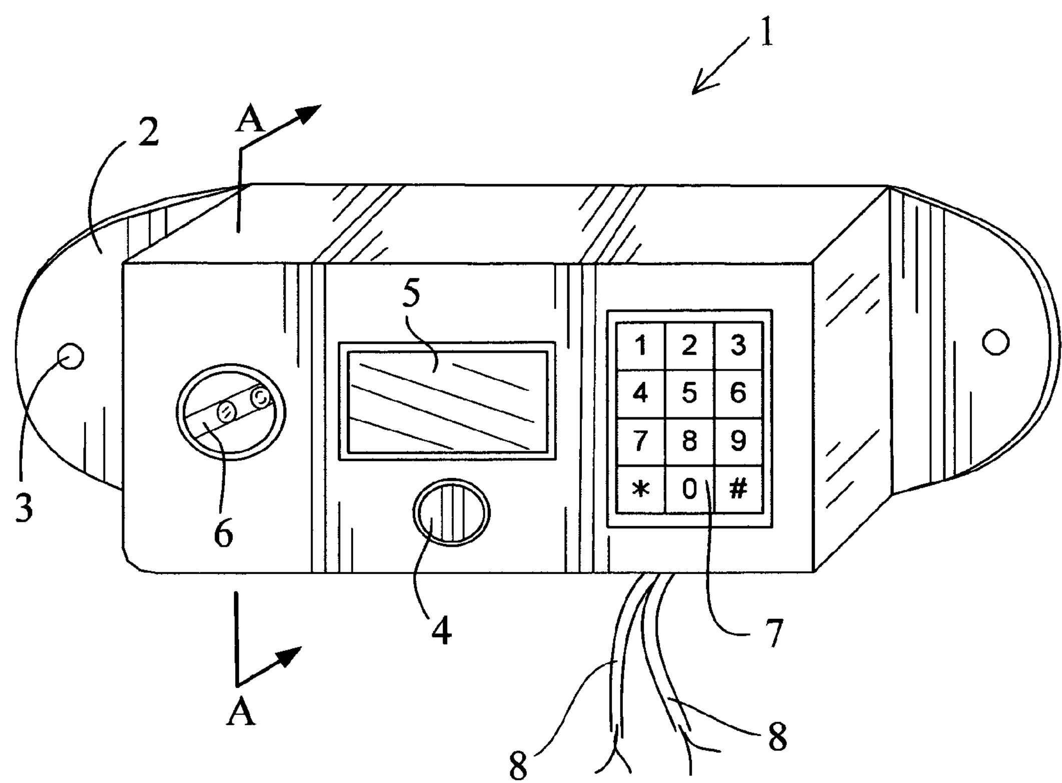
FIG. 1 is an isometric view of one embodiment of the motorcycle and bicycle alarm system in accordance with the inventive disclosures made herein.

FIG. 1 depicts the general appearance of one particular example of the motorcycle or bicycle alarm system in accordance with an embodiment of the inventive disclosures made herein. The alarm system protective housing or enclosure 1, as depicted, has a generally rectangular form. The major width and length dimensions are selected to accommodate a circuit board contained within including the cellular phone device, and in certain embodiments, a GPS receiver. The height of the enclosure assembly is selected to accommodate the mounted height of the circuit board and components in the enclosure including circuit board stand-offs and component heights on the circuit board. The enclosure has two mounting ears 2 secured to opposing ends of the enclosure, the ears provided with mounting holes 3 for mounting the alarm system to a motorcycle or bicycle. A key switch 4 is provided on the face of the alarm housing. The key switch is used to selectively interrupt power to or provide power to the alarm system. An electronic alpha-numeric display 5 is secured to a front face of the protective housing, the display is electrically interfaced to the logic and control means to display the configured telephone number to be automatically called in the event of an alarm condition. The tilt angle detector and the position of the metal ball within the transparent tilt detector housing is visible through the level indicator window 6. A touch sensitive keypad 7 is mounted to a front face of the protective housing and electrically interfaced to the logic and control means. The keypad keys comprise one key for each digit in the set of 1,2,3,4,5,6,7,8,9,0,*,#. The keypad provides a means for the rider to enter the phone number to be dialed over a cellular network in the event of an alarm condition. Power supply wiring 8 enter the bottom surface of the protective housing, receiving electrical power to operate the alarm system from the motorcycle battery.

Figure 2:
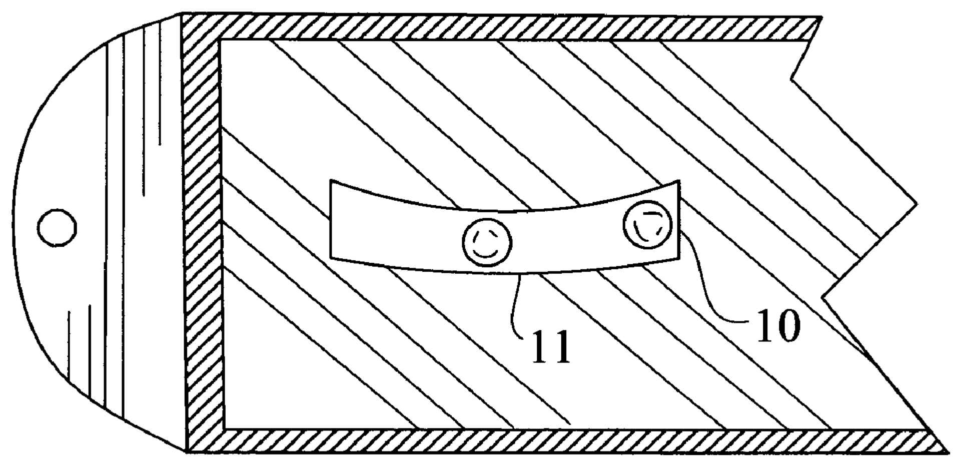
FIG. 2 is a cut away view of the alarm enclosure, showing the orientation of tilt angle detector in the interior of the enclosure in accordance with one embodiment of the inventive disclosures made herein.

FIG. 2 is a cut away view of the alarm enclosure, showing the orientation of tilt angle detector in the interior of the enclosure in accordance with one embodiment of the inventive disclosures made herein. The tilt angle detector is positioned directly behind the transparent level indicator window 6 of FIG. 1 so as the position of the metal ball in the tilt angle detector is visible through the transparent level indicator window. In FIG. 2 the orientation of the tilt level is shown, wherein the metal ball 10 is shown positioned when the motorcycle is at 90 degrees relative to the artificial horizon. When the motorcycle is resting on its side stand at approximately 10 degrees from vertical the metal ball rests at position 11.

Figure 3:
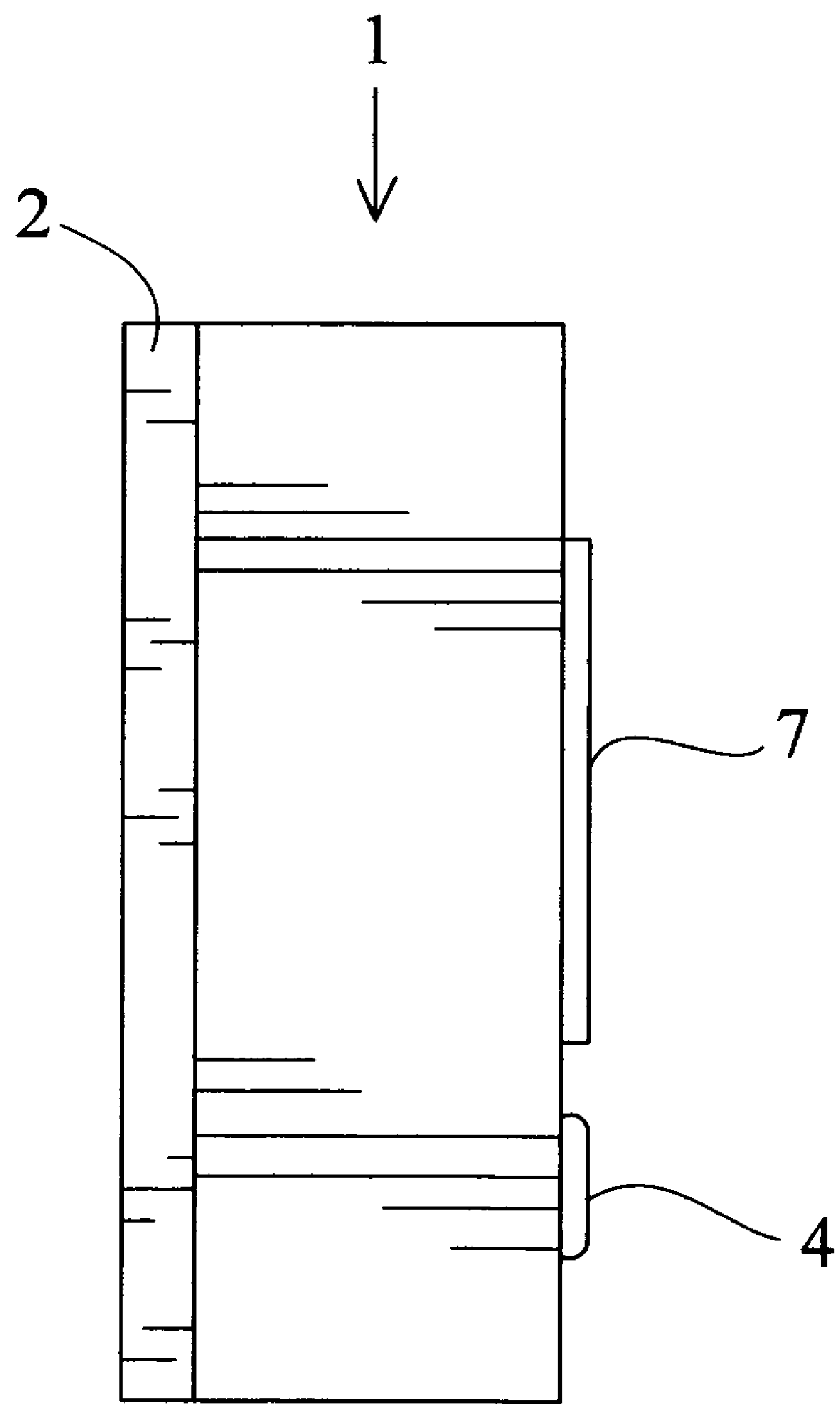
FIG. 3 is an end view of one embodiment of the motorcycle and bicycle alarm system in accordance with the inventive disclosures made herein.

FIG. 3 is an end view of one embodiment of the motorcycle and bicycle alarm system in accordance with the inventive disclosures made herein, showing the protective enclosure 1, the mounting tabs 2, the key switch 4 and the keypad 7.

Figure 4:
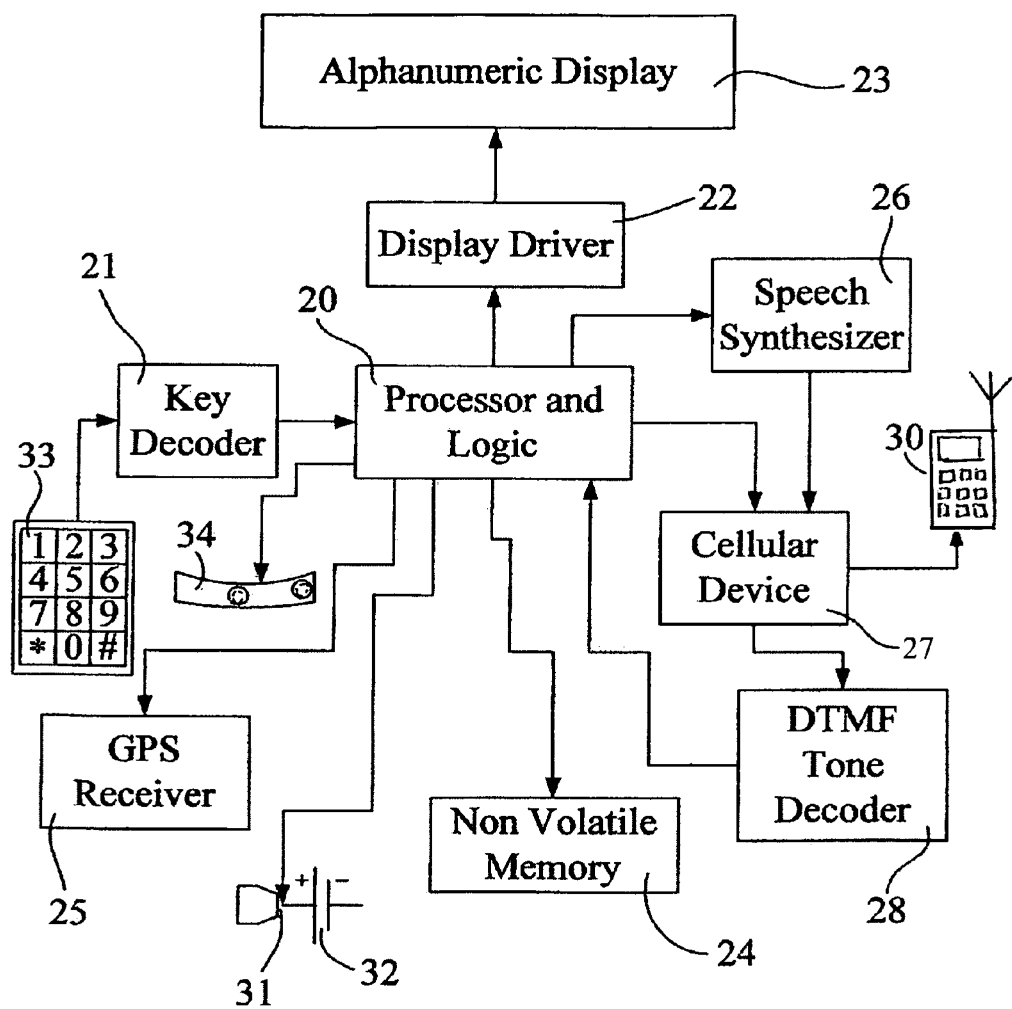
FIG. 4 is a partial schematic, partial block diagram of one embodiment of the motorcycle and bicycle alarm system in accordance with the inventive disclosures made herein.

FIG. 4 is a block diagram of circuitry of one exemplary embodiment of the motorcycle and bicycle alarm system in accordance with the inventive disclosures made herein, illustrating by functional blocks the active components of one embodiment of the alarm system. The active components of the alarm system include a processor and logic system 20, a keypad 33 for entering the phone number to be called in an alarm, a key decoder 21 for converting key presses into a digital form readable by the processor and logic system 20, a display driver 22 receiving data from the processor and logic system 20 and converting to drive the display segment of the numeric or alpha-numeric display 23. A master key switch 31 energizes or de-energizes the alarm system by permitting or interrupting current from the power supply 32 to the alarm system. A tilt detector 34 is interfaced to the processor and logic system 20, the tilt detector closing a contact output to the processor and logic system when the motorcycle is raised from its side stand and brought within 2 degrees of a vertical position. A non-volatile memory 24 is addressable by and interfaced to the processor and logic system 20 wherein the non-volatile memory 24 stores the configured phone number to be called in the event an alarm condition is detected. In this particular embodiment the alarm system includes a GPS (Global Positioning System) receiver 25 which provides the current motorcycle or bicycle global position coordinates to the processor and logic system 20. A digital speech synthesizer 26 provides its output to an integrated cellular telephone device 27. In the event of an alarm condition the processor and logic system 20 dials the configured phone number stored in the non-volatile memory 24. Once the telephone at the called number answers, the processor and logic system sends an alarm condition voice message as well as the vehicle coordinates from the GPS system 25 to the speech synthesizer 26. The speech synthesizer 26 then feeds its synthesized human voice message to the called party over the cellular network via cellular device 27 and internal cellular antenna 28. The message repeats for a pre-configured limited time, or until the person called hangs up. Once the call terminates or repeat cycle ends, the processor and logic system waits a selected time period and repeats by redialing the phone call then sending the alarm message and GPS coordinates. This process continues until the alarm system receives a remote deactivate command. The deactivate command is detected as the dual-tone multi-frequency (DTMF) tone set for the telephone pound key '#'. This tone may be sent at any time when a cellular phone 30 connection is present between the alarm system and another phone. For example, the owner after receiving an alarm notification call may command the alarm system to deactivate by depressing the asterisk '*' key on the phone during the call. Alternately, the owner, rider or operator may directly call the cellular phone device in the alarm system and command the alarm system to deactivate by depressing the asterisk '*' key after the connection is made. At any time when the alarm system is configured but not deactivated, the alarm system may be reactivated remotely by using a touch tone or cellular phone 30 to call the cellular device in the alarm system and command the alarm system to activate by depressing the asterisk '* ' key after the connection is made. The alarm activate and deactivate key press commands are detected by DTMF tone set decoder 28 which is interfaced to the processor and logic system 20. In the DTMF standard, low frequency and high frequency sinusoidal audio frequency pairs are generated, one pair corresponding to a phone keypad key pressed and are transmitted over the cellular network. The DTMF standard is a global telephony tone dialing standard.

Accordingly, it is a principal object of the inventive disclosures made herein to provide a novel and useful motorcycle and bicycle tamper and theft detection alarm system, one which overcomes the limitations of conventional security measures and systems.

In the preceding detailed description, reference has been made to the accompanying drawings that form a part hereof, and in which are shown by way of illustration specific embodiments in which the invention may be practiced. These embodiments and certain variants thereof have been described in sufficient detail to enable those skilled in the art to practice the invention. It is to be understood that other suitable embodiments may be utilized and that logical, material, mechanical, software and electrical changes may be made without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An anti-theft owner notification alarm system for a motorcycle, bicycle or other two-wheeled vehicle, comprising:

- a weather tight protective housing having mounting tabs for mounting the alarm to a surface of the vehicle;
- a key operated alarm system power switch secured to a front face of the protective housing;
- an electronic logic and control means mounted within said housing having one or more alarm activation inputs;
- a non-volatile memory electrically interfaced to, addressable from, and exchanging data with said logic and control means, the non-volatile memory for storing one or more phone numbers to be dialed by the alarm system in response to detecting an alarm condition;

a cellular telephone device secured within said housing, the cellular device electronically interfaced to said logic and control means, the cellular device configured for initiating and receiving calls on a cellular network under the direction of the logic and control means;

a means of generating an audible alarm, the alarm generation means electrically interfaced to the logic and control means and to the cellular device, the audible alarm for transmission by the cellular device;

a DTMF tone decoder electrically interfaced to the logic and control means and the cellular device, the tone decoder configured to interpret certain telephone keypad frequencies received by the cellular device as commands to enable or disable the alarm;

an electronic alpha-numeric display screen secured to a front face of the protective housing, the display electrically interfaced to the logic and control means;

a tilt angle detector having an alarm activation contact output electrically interfaced to the logic and control means, wherein the motorcycle sits at an angle while resting on the side stand, and wherein moving the bike to an upright position for riding or moving the bike activates the contact output; and a plurality of touch sensitive input keys mounted to a front face of said protective housing and electrically interfaced to the logic and control means, the keys comprising:

one key for each digit in the set of 1,2,3,4,5,6,7,8,9,0*, #, the touch sensitive input keys for entering the phone number to be dialed in an alarm condition, wherein when the tilt detector alarm activation output triggers the logic and control means to command the cellular device to dial the one or more stored numbers to notify the owner.

2. The anti-theft owner notification alarm system for a motorcycle or bicycle of claim 1, wherein the one or more phone numbers is one phone number.

3. The anti-theft owner notification alarm system for a motorcycle or bicycle of claim 1, wherein means of generating an audible alarm comprises a digital speech synthesizer, the speech synthesizer programmed to create a spoken language alarm message for transmission by the cellular device.

4. The anti-theft owner notification alarm system for a motorcycle or bicycle of claim 3, wherein the tilt angle detector comprises an electrically conductive metal ball rolling within a curved tubular housing having two electrodes, wherein raising the cycle off its side stand rolls the ball within the tube according to the change in the tilt angle and when it reaches within 2 degrees of vertical relative to the artificial horizon, the ball rolling on the electrodes conducts current triggering the alarm.

5. The anti-theft owner notification alarm system for a motorcycle or bicycle of claim 3, wherein the tilt angle detector comprises a mercury type tilt sensor consisting of a sealed transparent tube having two electrodes and a drop of mercury free to roll within, wherein raising the cycle off its side stand rolls the mercury ball within the tube according to the change in the tilt angle and when it reaches within 2 degrees of vertical relative to the artificial horizon the mercury ball rolling on the electrodes conducts current triggering the alarm.

6. The anti-theft owner notification alarm system for a motorcycle or bicycle of claim 4, further comprising a GPS receiver electrically interfaced to said logic and control means, the GPS receiver providing vehicle position in global positioning system world coordinates to said logic and control means.

7. A method of detecting when a motorcycle, bicycle or other two-wheeled vehicle is moved or stolen and then notifying the owner, the method comprising:

keying in a phone number to be called in the event of an alarm situation;

detecting a change in the tilt angle of the vehicle to within 2 degrees of vertical;

retrieving a phone number to be called from non-volatile memory;

commanding a cellular telephone device to dial the phone number over a cellular network;

waiting for a cellular call connection to be made;

generating an audible alarm signal over the cellular call connection;

terminating the cellular call connection;

delaying a pre-defined wait time period; and continuing at the above step of retrieving the phone number until alarm deactivation command is received.

8. The method of detecting when a motorcycle, bicycle or other two-wheeled vehicle is moved or stolen of claim 7, wherein the generating an audible alarm step comprises generating a spoken language alarm message over the cellular call connection.

9. The method of detecting when a motorcycle, bicycle or other two-wheeled vehicle is moved or stolen of claim 8, the method further comprising:

after the retrieving step, reading vehicle location coordinates from a global positioning system receiver;

after the generating an audible alarm step, vocally communicating the vehicle location coordinates to the cellular call recipient.

* * * * *